United States Patent [19]
Smith

[11] 3,772,832
[45] Nov. 20, 1973

[54] METHOD OF MANUFACTURING CONTACT LENSES

[76] Inventor: Joseph H. Smith, 1600 Wyoming Ave., Forty Fort, Pa.

[22] Filed: Aug. 16, 1972

[21] Appl. No.: 281,234

Related U.S. Application Data

[63] Continuation of Ser. No. 92,444, Nov. 24, 1970, abandoned.

[52] U.S. Cl.................................. 51/284, 51/323
[51] Int. Cl............................ B24b 1/00, B24b 9/14
[58] Field of Search..................... 51/284, 318, 129, 51/131, 132, 323

[56] References Cited
UNITED STATES PATENTS

| | | | |
|---|---|---|---|
| 2,990,664 | 7/1961 | Cepero | 51/284 |
| 3,087,284 | 4/1963 | Kratt | 51/284 X |
| 3,283,446 | 11/1966 | Feinbloom | 51/284 |
| 3,238,676 | 3/1966 | Borish | 51/284 |
| 3,360,889 | 1/1968 | Borish | 51/284 |
| 3,369,329 | 2/1968 | Beiman | 51/284 |

Primary Examiner—Donald G. Kelly
Attorney—Robert K. Youtie

[57] ABSTRACT

Contact lens manufacture wherein a semifinished lens or blank having the desired base curve is mounted for axial rotation and its concave side formed with a plurality of peripheral surfaces or curves having slightly different radii of curvature, each being greater than that of the base curve, and juncture line removal tools are presented having radii of curvature each between that of an adjacent pair of peripheral curves to effect juncture line removal.

3 Claims, 4 Drawing Figures

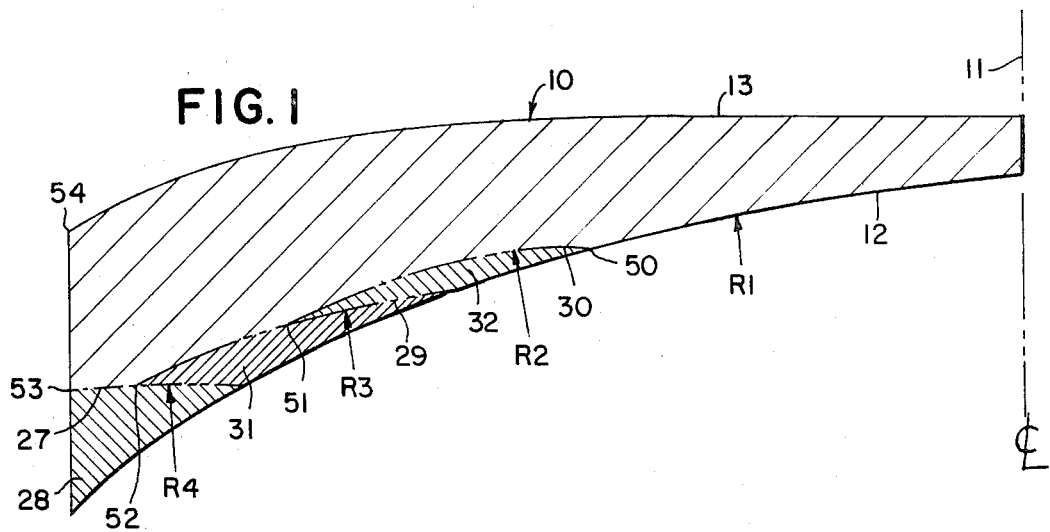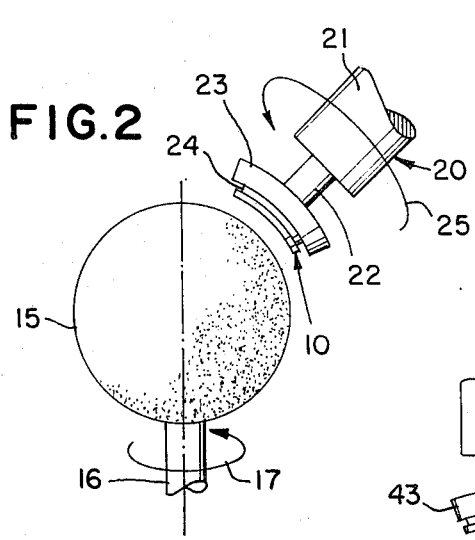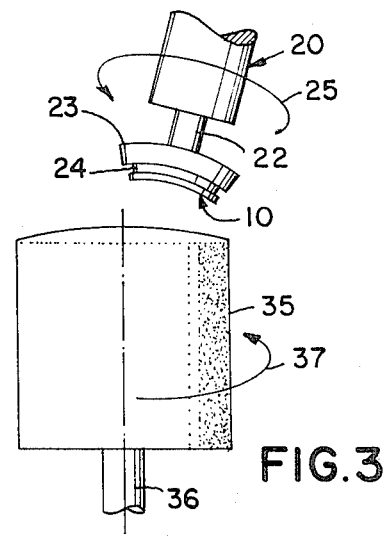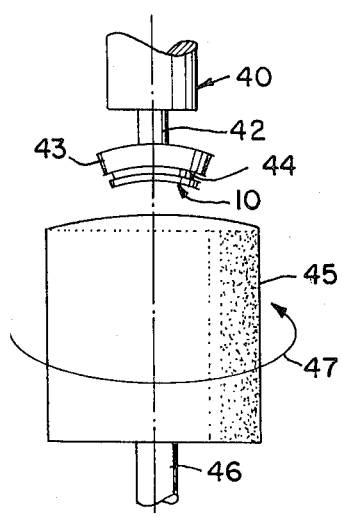
PATENTED NOV 20 1973
3,772,832
INVENTOR.
JOSEPH H. SMITH
BY Robert K. Youtie
ATTORNEY.

METHOD OF MANUFACTURING CONTACT LENSES

CROSS-REFERENCES TO RELATED APPLICATIONS

This application is a continuation of my copending U.S. Pat. application Ser. No. 92,444, filed Nov. 24, 1970, now abandoned.

BACKGROUND OF THE INVENTION

As is well known to those versed in the field of contact lenses, a formidable problem has existed in the toleration of contact lenses by the patient, some authorities estimating that a maximum of about fifty percent of those attempting to wear contact lenses finally being capable of wearing the lenses for a substantial amount of time day after day. This toleration has been associated primarily with the individual patient rather than with the method of lens manufacture.

Also an area of difficulty is the permissible amount of continuous wearing in those cases where toleration presents no problem, without damage to the eye.

While the prior art teaches the formation of an annular peripheral curve or bevel on the concave side of a contact lens, and the polishing out of the juncture line between the peripheral and base curves, for example U.S. Pat. No. 2,990,664 to Cepero, the prior art does not at all suggest the highly advantageous and totally unexpected result of applicant's particular disclosure herein.

SUMMARY OF THE INVENTION

It is an important object of the present invention to provide an improved method of manufacturing contact lenses which very greatly increases the number or percentage of patients capable of tolerating contact lenses for a substantial period of time in daily use.

It is still another object of the present invention to provide a method of contact lens manufacture which appears to result in contact lenses capable of greatly enhanced periods of permissible wear without damage to the wearer's eye.

It is a further object of the present invention to provide a contact lens and method of manufacture, which lens centers and holds better on a patient's eye, results in a more normal blink rate, and enables even a new patient to look upwardly more easily.

It is among the more particular objects of the present invention to provide a contact lens and method of manufacture which causes minimal eyelid irritation, produces less visual changes, less sensitivity to light, less awareness of peripheral light area, less tearing, reduced redness of eyes and lids, decreased nasal discharge, substantial elimination of burning, itching, stinging, scratching and fatique symptoms, decreased edema of the lids, and decreased mucoid discharge.

Other objects of the present invention will become apparent upon reading the following specification and referring to the accompanying drawings, which form a material part of this disclosure.

The invention accordingly consists in the combinations and arrangements of method steps which will be exemplified in the following description, and of which the scope will be indicated by the appended claims.

BRIEF DESCRIPTION OF THE DRAWINGS

FIG. 1 is a sectional view showing a lens of the present invention and illustrating successive steps in its manufacture.

FIG. 2 is an elevational view illustrating apparatus for use in manufacture of contact lenses according to the present invention, and showing an early stage in the instant method.

FIG. 3 is an elevational view showing additional apparatus as employed in an intermediate stage in the instant method.

FIG. 4 is an elevational view showing additional apparatus and illustrating a final stage in the instant method.

DESCRIPTION OF THE PREFERRED EMBODIMENT

Referring now more particularly to the drawings, and specifically to FIG. 1 thereof, a semifinished lens or lens blank is there generally designated 10, and is illustrated in diametral cross-section, the lens being shown on one side of the lens centerline 11.

The semifinished lens 10 may have its concave side finished to a desired base curve 12, the base curve being of a radius $R_1$ as required by a patient's prescription. The convex curve or surface 13 may also be finished on the semifinished lens 10, to produce the necessary prescription.

In an initial stage of the instant method, there is provided a tool 15 which is convex and may be spherical, as shown in FIG. 2, being mounted, as on a shaft 16 for axial rotation, say in the direction of arrow 17.

In addition, there is provided a lens holder 20, including a support member 21 journaling a rotary shaft 22, which carries on its outer end a chuck or lens holder 23. The lens 10 is mounted on the chuck or lens holder 23 by any suitable means, such as an adhesive means 24 interposed between the lens holder and lens. By this arrangement of apparatus, the lens 10 is mounted with its concave side exposed and is freely axially rotatable together with the lens holder 23, as indicated by the arrow 25.

In this condition, the tool 15 may be initially selected as a grinding tool, and with the lens holding device 20 having its axis of rotation generally oblique to the axis of rotation of the tool 15, the concave surface of lens 10 is presented to the grinding tool 15 for grinding of an initial peripheral or annular curve, as indicated at 27 in FIG. 1.

That is, the radius of tool 15 is selected so as to be larger than the radius $R_1$ of the base curve 12, and this results in the peripheral curve or annular surface 27 having a relatively large radius of curvature indicated as $R_4$ in FIG. 1. The grinding operation described thus removes a portion of the lens blank 10, as at 28.

Subsequently, the same essential procedure is repeated, but using a tool 15 having a radius of curvature between $R_1$ of the surface 12 and $R_4$ of the surface 27. For example, a tool 15 having a radius of curvature $R_3$ will produce an intermediate peripheral curve or annular surface, as indicated at 29 in FIG. 1.

Repeating the above-described operation but with a grinding tool 15 having still a smaller radius of curvature, say a radius $R_2$ of a length between the radii $R_3$ and $R_1$, will result in an additional peripheral or annular curve 30.

The initial grinding operation using a tool 15 having a radius $R_4$ is terminated upon the removal of lens portion 28 so as to leave a predetermined diameter of base curve surface 12. The subsequent grinding operation using a tool of radius $R_3$ removes the lens portion 31 and terminates to leave a predetermined diameter of base curve 12. Similarly, the grinding by a tool 15 of radius $R_2$ removes lens portion 32 and terminates to leave generally the finally desired base curve diameter.

It has been found advantageous in each of the above-discussed grinding operations to permit free rotation of the lens 10 with its holder 23 about the axis oblique to that of the grinding tool during the grinding operation.

In FIG. 3 is shown the lens carrier or support 20 of FIG. 2 carrying the lens 10 suitably secured, as by adhesive 24, to the lens support of chuck 23, the latter being coaxially rotatable together with the rotary shaft 22, say in the direction of arrow 25.

However, rather than a grinding tool 15, there is provided a polishing tool 35, which is mounted for axial rotation, as by a shaft 36 for rotation in the direction of arrow 37.

The lens holder 20 is directed with its chucked lens 10 toward the polishing tool 35, so that the concave lens surface is presented and the lens is freely rotatable about the axis of shaft 22 oblique to the axis of polishing tool rotation.

More specifically, the lens 10 in FIG. 3 is initially presented to a polishing tool 35 having a radius of curvature approximately equal to or slightly less than $R_2$, after which the polishing operation is repeated by presentation of the axially freely rotatable lens to a polishing tool having a somewhat larger radius, say equal to or slightly less than $R_3$. Subsequently the lens 10 in FIG. 3 is presented to a polishing tool 35 having a somewhat larger radius approximately equal to or slightly less than $R_4$. These polishing operations serve to effectively polish the peripheral curves or surfaces 30, 29 and 27.

Referring now to FIG. 4, there is illustrated a lens holder 40 from which extends a shank 42 carrying on its outer end a lens support or chuck 43. A lens to be operated upon is generally designated 10, and is secured to the chuck 43 by any suitable means, such as adhesive 44, so as to present the concave side of the lens for further working. In practice, the lens 10 in FIG. 4 is secured to the chuck 43 generally coaxially with the chuck and holder 40.

An additional polishing tool is generally designated 45, being carried by a rotary shaft 46 for axial rotation, say in the direction of arrow 47.

In this condition, the nonrotating lens 10 of FIG. 4 is presented to the polishing tool 45 for polishing of the concave lens side. The polishing in FIG. 4 employs a series of polishing tools 45 for removing the juncture lines or points of adjacent curves 12, 30, 29 and 27. More specifically, an annular juncture line or point is seen in FIG. 1 at 50, being the juncture of curves 12 and 30, while an additional annular juncture line or point 51 is defined by the meeting of curves 30 and 29, and still another annular juncture line or point 52 is formed at the meeting of curves or surfaces 29 and 27. The polishing operation illustrated in FIG. 4 effectively removes the juncture lines or points 50, 51 and 52. Toward this end, the lens 10 may be nonrotatably presented in axial alignment with a tool 45, as illustrated in FIG. 4, with a tool of a radius of curvature between the radii $R_1$ and $R_2$. This will effectively remove juncture line 50.

A polishing tool 45, employed as illustrated in FIG. 4, having a radius of curvature between $R_2$ and $R_3$ will effectively remove juncture line 51, while a polishing tool 45 having a radius of curvature between $R_3$ and $R_4$ will effectively remove juncture line 52. Of course, additional polishing tools 45 having different radii of curvature may be employed to enhance the removal of juncture lines 50, 51 and 52. It is only essential that the polishing tools 45 must each have a radius of curvature greater than $R_1$, that of the base curve 12.

It remains necessary only to conventionally edge polish the lens 10 in the usual manner to round off edge juncture lines 53 and 54.

While the foregoing description is believed adequate to enable one skilled in the art to practice the instant invention, a specific example will be given below, intended merely by way of illustration and without limitation.

For example, in a contact lens having a power of (−)1.50 diopters, having a base curve with a radius of curvature of 8.50mm., and an optic zone or diameter of base curve to be 8.30mm., with the final outside diameter to be 9.60mm.

In the successive grinding operations illustrated in FIG. 2, to produce the peripheral surfaces 27, 29 and 30, the below-listed tools may be used in the sequence listed:

1. 12.6mm. radius grinding tool cut into 9.6mm. base curve diameter.
2. 12.0mm. radius grinding tool cut into 9.1mm. base curve diameter.
3. 11.5mm. radius grinding tool cut into 9.0mm. base curve diameter.
4. 11.0mm. radius grinding tool cut into 8.9mm. base curve diameter.
5. 10.5mm. radius grinding tool cut into 8.8mm. diameter base curve.
6. 10.0mm. radius grinding tool cut into 8.7mm. diameter base curve.
7. 9.5mm. radius grinding tool cut into 8.6mm. base curve diameter.
8. 9.2mm. radius grinding tool cut into 8.5mm. base curve diameter.
9. 9.0mm. radius grinding tool cut into 8.4mm. base curve diameter.

Of course, a greater or lesser number of grinding tools may be employed. The greater number increases the number of annular juncture lines, and decreases the sharpness or angle between adjacent peripheral curves.

Subsequent to the above-described procedure shown in FIG. 2, the procedure illustrated in FIG. 4 is followed. In this procedure there are used, in sequence, a series of polishing tools, say in the following order of use: polishing tool radii of 8.7mm., 8.9mm., 9.1mm. . . . 12.3mm. and 12.5mm.

After the polishing operation of FIG. 3, with the lens freely axially rotatable about an axis oblique to the axis of rotation of the polishing tool, the juncture line removal operation of FIG. 4 is performed.

That is, with the lens holder 40 and lens 10 stationary, and coaxial with the tool 45, a series of different radii tools are successively applied to the lens. For example, the polishing tools 45, in the order of use, may be as follows: polishing tool radii of 8.6mm., 8.8mm., 9.0mm. . . . 12.4mm. and 12.6mm.

Here also, the number of polishing tools 45 may be greater or less, and the intervals between their radii may be less or greater, as the operator desires.

It is to be understood that the method of the instant invention is not limited to the formation of spherical curves, but may employ other than spherical curves, for instance parabolic, elliptical, or other, without departing from the instant invention. Further, the instant invention may utilize curves or curved surfaces of spherical together with nonspherical, and different types of nonspherical surfaces may be employed together, if desired.

From the foregoing, it is seen that the present invention provides a method of contact lens manufacture which may be readily accomplished by those skilled in the art, and its practice will fully accomplish the intended objects.

Although the present invention has been described in some detail by way of illustration and example for purposes of clarity of understanding, it is understood that certain changes and modifications may be made within the spirit of the invention.

What is claimed is:

1. In the method of manufacturing contact lenses, the steps which comprise: providing a semifinished lens having a desired base curve, supporting said lens for axial rotation with its concave side exposed, presenting to the concave side of said lens a first rotary grinding tool having a curvature of greater radius than that of said base curve to grind a first annular peripheral curve on said lens and leave a predetermined base curve diameter, presenting to the concave side of said lens a second rotary grinding tool having a curvature of radius between that of said first rotary grinding tool and said base curve to grind a second annular peripheral curve on said lens and leave a predetermined base curve diameter, presenting to the concave side of said lens at least one additional rotary grinding tool having a curvature of radius between that of the preceding grinding tool and said base curve to grind at least one additional annular peripheral curve on said lens and leave a predetermined base curve diameter, presenting to said concave lens side a first rotary polishing tool having approximately the same curvature as said first grinding tool to polish said first peripheral curve, presenting to said concave lens side a second rotary polishing tool having approximately the same curvature as said second grinding tool to polish said second peripheral curve, presenting to said concave lens side at least one additional rotary polishing tool having approximately the same curvature as said one additional grinding tool to polish said one additional peripheral curve, holding said lens against rotation with its concave side exposed, presenting to said concave lens side a first rotary juncture line removal polishing tool having a radius of curvature between that of said first and second grinding tools while maintaining said lens coaxial with said last mentioned polishing tool to more effectively blend the juncture of said first and second peripheral curves, presenting to said concave lens a second rotary juncture line removal polishing tool having a radius of curvature between that of said second and additional grinding tools while maintaining said lens coaxial with said last mentioned polishing tool to more effectively blend the juncture of said second and additional peripheral curves, and presenting to said concave lens side at least one additional rotary juncture line removal polishing tool having a radius of curvature between that of said additional grinding tool and base curve while maintaining said lens coaxial with said last mentioned polishing tool to more effectively blend the juncture of said additional peripheral and base curves.

2. The method of manufacturing contact lenses according to claim 1, further characterized in presenting said rotary grinding tools which have radii of curvature differing by approximately 0.5 mm.

3. The method of manufacturing contact lenses according to claim 2, further characterized in grinding successive peripheral curves to successively reduce the base curve diameter approximately 0.1 mm.

* * * * *